United States Patent [19]

Neugebauer

[11] 4,148,227

[45] Apr. 10, 1979

[54] WORM AND WORM-RACK WITH HYDROSTATIC LUBRICATION

[75] Inventor: Heinz Neugebauer, Weidach, Fed. Rep. of Germany

[73] Assignee: Werkzeugmaschinenfabrik Adolf Waldrich Coburg, Bayern, Fed. Rep. of Germany

[21] Appl. No.: 840,277

[22] Filed: Oct. 7, 1977

Related U.S. Application Data

[63] Continuation of Ser. No. 439,634, Feb. 4, 1974, abandoned, which is a continuation-in-part of Ser. No. 238,202, Mar. 27, 1972, abandoned.

[30] Foreign Application Priority Data

Apr. 10, 1971 [DE] Fed. Rep. of Germany ....... 2117491

[51] Int. Cl.² ............... F16H 57/04; F16H 55/18; F16H 1/04
[52] U.S. Cl. ........................................ 74/467; 74/409; 74/422

[58] Field of Search .............. 74/467, 468, 422, 424.5, 74/440, 409

[56] References Cited

U.S. PATENT DOCUMENTS

| | | | |
|---|---|---|---|
| 3,448,632 | 6/1969 | Rumbarger | 74/468 |
| 3,454,136 | 7/1969 | Stark | 74/467 |
| 3,651,706 | 3/1972 | Galbarini et al. | 74/467 X |

*Primary Examiner*—Leonard H. Gerin
*Attorney, Agent, or Firm*—Blanchard, Flynn, Thiel, Boutell & Tanis

[57] ABSTRACT

A worm and worm-rack combination with hydrostatic lubrication therebetween. The teeth of the worm and the worm-rack have a trapezoidal cross-section and lubricating oil is supplied through openings in the toothed flanks. The half angle formed between each of the toothed flanks and the line of action to the axis of the worm is limited solely to the range of 6 to 10 degrees and the lead angle is in the range of 2 to 10 degrees.

4 Claims, 2 Drawing Figures

WORM AND WORM-RACK WITH HYDROSTATIC LUBRICATION

CROSS REFERENCE TO RELATED APPLICATION

This is a continuation, of application Ser. No. 439,634, now abandoned which is a continuation-in-part application of Ser. No. 238,202, filed Mar. 27, 1972, now abandoned.

FIELD OF THE INVENTION

The invention concerns a worm and worm-rack with hydrostatic lubrication, especially for machine tools, in which the teeth of the worm and worm-rack present, in cross-section, a trapezoid section and in which lubricating oil bore-holes open into the tooth flanks of the worm or worm-rack, which are supplied with lubricating oil under pressure.

BACKGROUND OF THE INVENTION

In hydrostatically lubricated mechanisms consisting of a rotatable worm and a linearly movable worm-rack, the trapezoid section of the teeth hitherto used in mechanisms without hydrostatic lubrication has been retained. The half-angle of the flank, i.e. the angle formed by the flank of the tooth with the line of action to the axis of the worm is in the range of 15° to 20° in this case. With these relatively large half-angles there is the danger that the table bearing the rack will be vertically displaced by the force components bearing in a vertical direction on the flank, and this is especially liable to occur where the table rises in its guide. Moreover, as a result of the vertical displacement of the rack in relation to the worm, the space for lubrication between the flanks of the worm and the worm-rack is altered. With hydrostatic lubrication, this can lead to further disturbances and inaccuracies in working. In addition, with hydrostatic lubrication a large half-angle for the flank has the disadvantage that the axes of the worm and the worm-rack must be very accurately aligned. Even a slight displacement of the axis of the worm-rack in relation to the axis of the worm will lead, in fact, to a considerable increase in the space for lubrication, so that a considerably higher performance is required of the pumps supplying the lubricating oil under pressure to the lubricating oil bore-holes, a performance which is often not available. Displacement of the center and the angle between worm and worm-rack can, in particular, be expected to result in uneven spacing over the length of the flanks. This may interfere to a considerable extent with the building-up of a hydrostatic film of the pressure medium.

The problem of the invention is to create a worm and worm-rack with hydrostatic lubrication, especially for machine tools, in which vertical displacement of the worm-rack in relation to the worm is avoided and in which both parts can nevertheless still be assembled and disassembled by vertical movement, i.e. by movement at right-angles to the axis of the worm.

This is achieved, according to the invention, in that (1) the lead angle of the worm, i.e. the angle formed between a tangent to the pitch helix and a plane perpendicular to the axis of the worm, is in the range of 2° to 10° and (2) the half-angle of the flank ($\alpha$), i.e. the angle formed between the flank of the tooth and the line of the action to the axis of the worm, is in the range of 6° to 10°. The lead angle is preferably in the range of 2° to 5° and the half-angle of the flank ($\alpha$) should preferably be equal to 7°.

DETAILED DESCRIPTION

Figure 1:
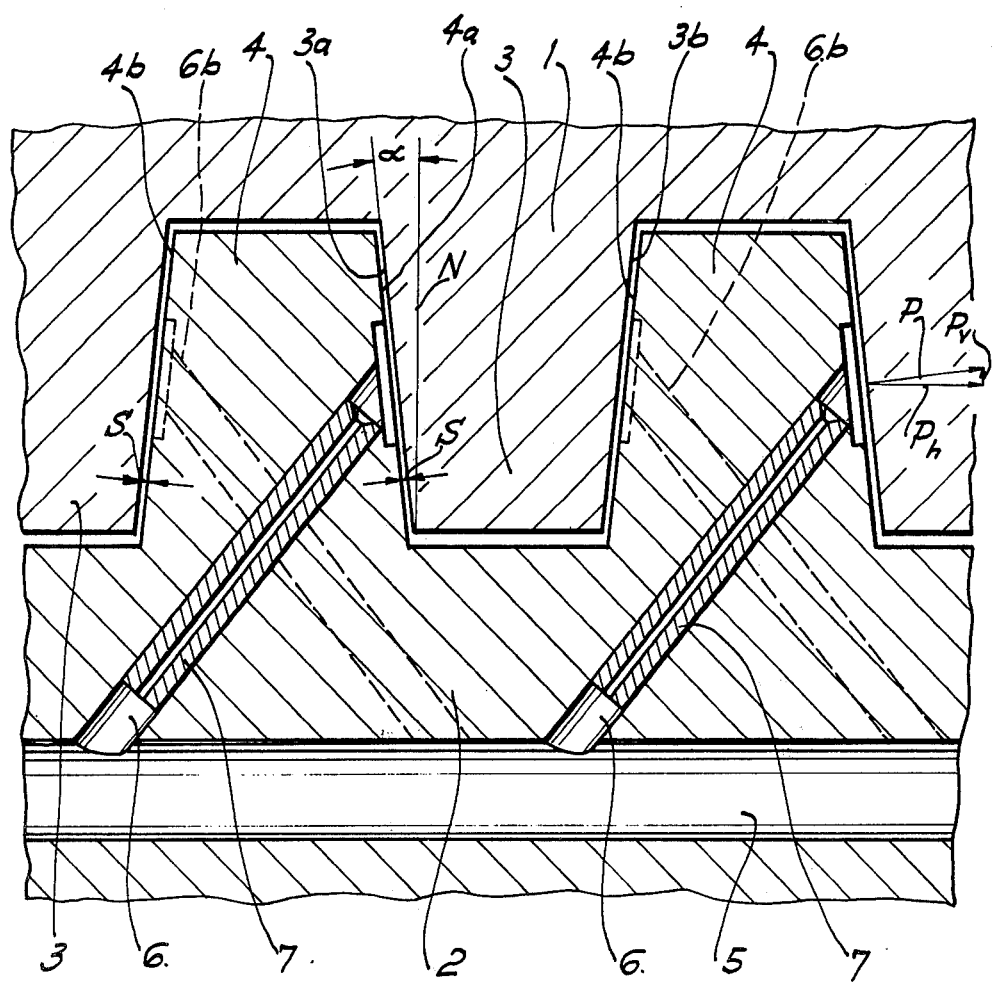
FIG. 1 is a fragmentary sectional view of a worm and worm-rack embodying my new invention.

In the drawing the worm-rack is marked 1, the worm 2. The worm-rack 1 has teeth 3 with trapezoid sections. The flanks of the teeth are marked 3a and 3b. Correspondingly the worm has teeth 4 with flanks marked 4a and 4b. Inside the worm 2 several distribution ducts 5 are provided, parallel with the axis, and connected with the tooth flanks 4a by lubricating oil bore-holes 6. The lubricating oil bore-holes 6 may, according to known procedure, show capillary valves 7. If the mechanism has only one worm, this has further lubricating oil bore-holes 6b, which open into the flanks 4b. The lubricating oil bore-holes 6b are connected with a further set of distribution ducts, parallel with the axis, so that the flanks 4a and 4b which face in different directions can be separately supplied with lubricating oil under constant pressure. In this way there builds up between the tooth flanks of the worm and the worm-rack a hydrostatic film of lubrication under constant pressure, which prevents direct contact between worm and worm-rack. It is of importance, in this connection, that the space for lubrication S existing between the tooth flanks should show the prescribed size, since otherwise, if the space for lubrication is too small, the danger will arise of metallic contact between worm and worm-rack, or else, if the space for lubrication is too wide, a high performance is required of the pumps.

Figure 2:
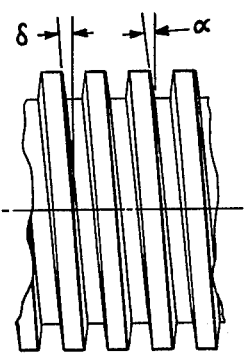
FIG. 2 is an illustration of the worm having the lead angle ($\delta$) and the half-angle ($\alpha$) indicated thereon.

According to the invention (1) the lead angle 5 (FIG. 2) is in the range of 2° to 10°, and preferably 2° to 5°, and (2) the half-angle of the flank $\alpha$, i.e. the angle formed by the tooth flank, here for example tooth flank 3a, with the line of action N to the axis of the worm, is in the range of 6° to 10°. This angle $\alpha$ should preferably be equal to 7°. The half-angle of the flank in the case of the remaining flanks 3b, 4a and 4b, shows the same size as the half-angle of the flank 3a.

Owing to the relatively small half-angle, the necessarily resultant vertical force component $P_v$ as is apparent from the drawing, becomes relatively small, so that this force component is no longer in a position to displace the table vertically. This allows the removal of the so-called overgrips from the table, i.e. guides designed to prevent the lifting-off of the table. Owing to the relatively small half-angle of the flank, the width of the lubricating space alters only to an unimportant extent, if the axis of the worm-rack 1 and that of the worm 2 are not accurately aligned vertically. An error of alignment of this kind may occur, for example, as a result of working margins. Since in an error of alignment of this kind, the width of the space for lubrication alters only to an unimportant extent, the performance hitherto allowed for the pumps will be adequate for the supply of lubricating oil.

It is inadvisable to select a half-angle to the flank of less than 6°, since this may give rise to considerable difficulties in the assembly of the table. As a rule, in fact, the table is placed on the guides from above by means of a crane, and in this operation, the teeth of the worm-rack fixed to the table must be inserted between the teeth of the worm set in the bed. With the considerable weights of tables in the case of large machine tools, it is only possible with very great difficulty to maneuver the table into position over the bed and the worm so accurately that the teeth of the worm-rack are in exact alignment with the tooth-spaces of the worm. An inclination of approximately 6° in the tooth-flanks is, however, generally sufficient to enable the table to be assembled vertically.

The half-angle $\alpha$, as will be apparent from inspection of the drawing, is often referred to as the pressure angle of the thread, which pressure angle is one-half the total thread angle when using a symmetrical thread as illustrated.

The embodiments of the invention in which an exclusive property or privilege is claimed are defined as follows:

1. A worm and worm-rack having hydrostatic lubrication means therein, the teeth of said worm and worm-rack having a trapezoid section in cross-section and lubricating oil bore-holes which open into the zones between the tooth flanks of the worm and worm-rack and supplied with lubricating oil under pressure, said worm-rack being capable of very small movements toward and away from the axis of rotation of said worm in response to forces applied to said worm-rack which are at a right angle to said axis of rotation of said worm, comprising the improvement wherein the half-angle ($\alpha$) formed between each of said tooth flanks and the line of action (N) to the axis of the worm is limited solely to the range of 6° to 10°, and wherein the lead angle ($\delta$) is in the range of 2° to 10° whereby said very small relative movements between said worm and said worm-rack in response to forces applied to said worm-rack is minimized.

2. The improvement according to claim 1, wherein said half-angle is 7°.

3. The improvement according to claim 1, wherein said half-angle is 6°.

4. The improvement according to claim 1, wherein the lead angle is in the range of 2° to 5°.

* * * * *